(12) United States Patent
Kawakatsu et al.

(10) Patent No.: US 7,886,549 B2
(45) Date of Patent: Feb. 15, 2011

(54) REFRIGERATION SYSTEM

(75) Inventors: Noriyasu Kawakatsu, Osaka (JP);
Shigeto Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 441 days.

(21) Appl. No.: 11/991,105

(22) PCT Filed: Sep. 8, 2006

(86) PCT No.: PCT/JP2006/317833

§ 371 (c)(1),
(2), (4) Date: Feb. 27, 2008

(87) PCT Pub. No.: WO2007/029802

PCT Pub. Date: Mar. 15, 2007

(65) Prior Publication Data

US 2010/0064723 A1 Mar. 18, 2010

(30) Foreign Application Priority Data

Sep. 9, 2005 (JP) .............................. 2005-261768

(51) Int. Cl.
*F25B 39/04* (2006.01)
(52) U.S. Cl. .............................. 62/183; 62/197; 62/498

(58) Field of Classification Search ............... 62/183, 62/510, 197, 498, 513, 515
See application file for complete search history.

(56) References Cited

U.S. PATENT DOCUMENTS

| 5,546,073 | A | * | 8/1996 | Duff et al. ............... 340/585 |
| 7,331,187 | B2 | * | 2/2008 | Kates ..................... 62/129 |
| 2006/0196197 | A1 | * | 9/2006 | Kates ..................... 62/129 |

FOREIGN PATENT DOCUMENTS

| JP | 4-98040 A | 3/1992 |
| JP | 2003-21410 A | 1/2003 |
| JP | 2004-340525 A | 12/2004 |
| JP | 2005-180815 A | 7/2005 |

* cited by examiner

*Primary Examiner*—Melvin Jones
(74) *Attorney, Agent, or Firm*—Birch, Stewart, Kolasch & Birch, LLP

(57) ABSTRACT

If the degree of opening of an electronic expansion valve (14) continues to remain below a specified degree of opening or if the degree of superheat of an evaporator (15) continues to remain above a predetermined degree of superheat, it is determined that the refrigerant circulation amount is in short supply in the water-cooled operation mode, and an air-cooled condenser fan (21) is tuned on.

4 Claims, 5 Drawing Sheets

REFRIGERATION SYSTEM

TECHNICAL FIELD

The present invention relates generally to a refrigeration system in which either one of a water-cooled condenser and an air-cooled condenser is used as a cold heat source to condense refrigerant. This invention relates more particularly to a technique for the return back of oil to a compressor of such a refrigeration system.

BACKGROUND ART

Refrigeration systems, used for marine containers et cetera to provide cooling of the inside of the container compartments, have been known in the art for many years. In a marine-container refrigeration system, air may not be available as a cold heat source due to the shipboard equipment. To cope with this, there are proposed refrigeration systems such as one disclosed in JP-A-2004-340525. This refrigeration system, which is equipped with an air-cooled condenser and a water-cooled condenser, operates, selectively in response to the container installation situation, either in an air-cooled operation mode in which the refrigerant is condensed using air as a cold heat source or in a water-cooled operation mode in which the refrigerant is condensed using cooling water as a cold heat source.

More specifically, the refrigeration system is provided with a refrigerant circuit (60) (see FIG. 6). The refrigerant circuit (60) includes a compressor (61), an air-cooled condenser (62), a water-cooled condenser (63), an electronic expansion valve (64), and an evaporator (65) which are connected in series to operate a vapor compression refrigeration cycle. The air-cooled condenser (62) is arranged outside the container compartment. An air-cooled condenser fan (66) is installed in the vicinity of the air-cooled condenser (62). On the other hand, the water-cooled condenser (63) is configured such that it is suppliable with cooling water. In addition, the evaporator (65) is arranged within the container compartment. An evaporator fan (67) is installed in the vicinity of the evaporator (65).

When the refrigeration system operates in the air-cooled operation mode, the air-cooled condenser fan (66) and the evaporator fan (67) are turned on and the supply of cooling water to the water-cooled condenser (63) is stopped. After refrigerant compressed in the compressor (61) is sent to the air-cooled condenser (62), heat exchange takes place in the air-cooled condenser (62) between outside compartment air supplied by the air-cooled condenser fan (66) and the refrigerant, and the refrigerant gives up heat to the outside compartment air and is condensed. Thereafter, the refrigerant passes as it is through the water-cooled condenser (63), is decompressed in the electronic expansion valve (64), and flows into the evaporator (65). Heat exchange takes place in the evaporator (65) between inside compartment air supplied by the evaporator fan (67) and the refrigerant, and the refrigerant absorbs heat from the inside compartment air and is evaporated. As a result, the air in the container compartment is cooled. The refrigerant evaporated in the evaporator (65) is drawn into and again compressed by the compressor (61) up to a predetermined pressure.

On the other hand, during the water-cooled operation mode, the air-cooled condenser fan (66) is turned off, and at the same time that the evaporator fan (67) is turned on, cooling water is supplied to the water-cooled condenser (63). Accordingly, refrigerant compressed in the compressor (61) is not substantially condensed in the air-cooled condenser (62), but it gives up heat to the supplied cooling water in the water-cooled condenser (63) and is condensed. The refrigerant condensed in the water-cooled compressor (63) flows and passes through the electronic expansion valve (64) and then through the evaporator (65), and is used to provide cooling of the inside of the container compartment, as in the air-cooled operation mode.

DISCLOSURE OF THE INVENTION

Problems that the Invention Seeks to Overcome

Incidentally, the rate of heat exchange of the air-cooled condenser is generally lower than that of the water-cooled condenser. Besides, the air-cooled condenser is larger in size than the water-cooled condenser. Consequently, in a refrigeration system of the type which operates selectively either in the air-cooled operation mode or in the water-cooled operation mode, the amount of refrigerant that the refrigerant circuit requires is generally larger in the air-cooled operation mode than in the water-cooled operation mode. Therefore, the refrigerant circuit should be filled with a specified amount of refrigerant which is an amount of refrigerant required in the air-cooled operation mode. However, if the water-cooled operation mode is run at that refrigerant filling amount, the refrigerant filling amount becomes excessive relative to the required refrigerant circulation amount. As a result, surplus refrigerant is accumulated in the form of liquid in the water-cooled condenser, leading to the possibility that the high pressure of the refrigerant circuit may increase to an abnormal level.

It is conceivable to overcome such a problem with the prior art by decreasing, when the high pressure of the refrigerant circuit becomes more than a specified pressure as an upper limit value, the degree of opening of the electronic expansion valve in order that the high pressure of the refrigerant circuit may be reduced. In other words, under normal operation conditions, the degree of opening of the electronic expansion valve is regulated in response to the degree of superheat of the evaporator. However, in the case where the high pressure abnormally increases, the degree of opening of the electronic expansion valve is forcibly decreased in order that the refrigerant circulation amount may be reduced whereby the high pressure of the refrigerant circuit is prevented from increasing.

However, if the degree of opening of the electronic expansion valve is forcibly decreased to cut down the refrigerant circulation amount of the refrigerant circuit in the way as described above, the amount of return oil, i.e., the amount of refrigerating machine oil present in the refrigerant discharged from the compressor and drawn again into and reclaimed to the compressor, is also reduced. As a result, the amount of refrigerating machine oil for providing lubrication of the compression mechanism of the compressor or the like is in short supply, thus leading to the possibility that the compressor may be damaged.

In view of the above-described problem, the present invention was devised. Accordingly, an object of the present invention is to ensure, in a refrigeration system which operates selectively either in the air-cooled operation mode or in the water-cooled operation mode, a sufficient amount of return oil to the compressor while inhibiting the high pressure from increasing during the water-cooled operation mode Means for Overcoming the Problem The present invention provides, as a first aspect, a refrigeration system which comprises: (a) a refrigerant circuit (10)

in which a compressor (11), an air-cooled condenser (12), a water-cooled condenser (13), an electronic expansion valve (14), and an evaporator (15) are connected and through which a refrigerant is circulated to operate a refrigeration cycle and (b) an air-cooled condenser fan (21) for supplying air to the air-cooled condenser (12) wherein the refrigeration system is so configured as to operate selectively either (i) in an air-cooled operation mode in which the refrigerant is passed through the air-cooled condenser (12) in a state with the air-cooled condenser fan (21) turned on and through the water-cooled condenser (13) in a state with the supply of cooling water stopped, or (ii) in a water-cooled operation mode in which the refrigerant is passed through the air-cooled condenser (12) in a state with the air-cooled condenser fan (21) turned off and through the water-cooled condenser (13) in a state with the supply of cooling water provided, and wherein the degree of opening of the electronic expansion valve (14) is either regulated in response to the degree of superheat of the refrigerant leaving the evaporator (15) or forcibly decreased if the high pressure of the refrigerant circuit (10) becomes higher than a specified pressure. The refrigeration system of the first aspect is characterized in that it includes a controller means (40) which turns on the air-cooled condenser fan (21) if it is determined during the water-cooled operation mode that the amount of circulation of the refrigerant through the refrigerant circuit (10) is in short supply.

The refrigeration system of the first aspect operates selectively either in the air-cooled operation mode in which simultaneously with turning on the air-cooled condenser fan (21), the supply of cooling water to the water-cooled condenser (13) is stopped and the air-cooled condenser (12) is used as a cold heat source or in the water-cooled operation mode in which simultaneously with turning off the air-cooled condenser fan (21), the supply of cooling water is provided to the water-cooled condenser (13) and the water-cooled condenser (13) is used as a cold heat source.

As mentioned above, in the water-cooled operation mode, the refrigerant in the refrigerant circuit (10) is in excess supply and, as a result, the refrigerant pressure at the high pressure side tends to increase. Consequently, although the degree of opening of the electronic expansion valve (14) of the refrigeration system of the present invention is regulated basically in response to the degree of superheat of the evaporator (15), its degree of opening is forcibly decreased to thereby inhibit the high pressure from increasing, when the high pressure becomes higher than the specified pressure. However, if the degree of opening of the electronic expansion valve (14) continues to remain in the decreased state, this reduces the amount of circulation of the refrigerant through the refrigerant circuit (10). As a result, the amount of return oil to the compressor (11) becomes deficient.

In the present invention, in order to prevent the amount of return oil to the compressor (11) from being in short supply, the controller means (40) controls the air-cooled condenser fan (21) to turn on if it is determined during the water-cooled operation mode that the amount of circulation of the refrigerant through the refrigerant circuit (10) is being in short supply. As a result, heat change takes place in the air-cooled condenser (12) between the air supplied by the air-cooled condenser fan (21) and the refrigerant, so that the refrigerant is condensed in both the air-cooled condenser (12) and the water-cooled condenser (13). Consequently, the refrigerant pressure in the refrigerant circuit (10) drops, thereby making it possible to make the high pressure lower than the specified pressure. As a result, it becomes possible to increase the degree of opening of the electronic expansion valve (14) in a state with its degree of opening forcibly decreased and, therefore, the amount of circulation of the refrigerant through the refrigerant circuit (10) will increase to eliminate the lack of the amount of return oil to the compressor (11).

The present invention provides, as a second aspect according to the first aspect, a refrigeration system that is characterized in that the controller means (40) determines that the refrigerant circulation amount is in short supply if the degree of superheat of the refrigerant leaving the evaporator (15) continues to remain above a specified degree of superheat for a predetermined period of time, and then turns on the air-cooled condenser fan (21).

In the second aspect of the present invention, the condition that the amount of circulation of the refrigerant through the refrigerant circuit (10) is being in short supply in the water-cooled operation mode, is determined based on the degree of superheat of the refrigerant leaving the evaporator (15). In other words, it can be estimated that the amount of refrigerant flowing through the evaporator (15), i.e., the refrigerant circulation amount, is definitely in short supply if the degree of superheat of the evaporator (15) continues to remain higher than the specified degree of superheat. In this case, the controller means (40) controls the air-cooled condenser fan (21) to turn on to thereby lower the high pressure of the refrigerant circuit (10). As a result, it becomes possible to increase the degree of opening of the electronic expansion valve (14) whereby the amount of circulation of the refrigerant through the refrigerant circuit (10) is increased to thereby eliminate the lack of the amount of return oil to the compressor (11).

The present invention provides, as a third aspect according to the first aspect, a refrigeration system that is characterized in that the controller means (40) determines that the refrigerant circulation amount is in short supply if the degree of opening of the electronic expansion valve (14) continues to remain below a specified degree of opening for a predetermined period of time, and then turns on the air-cooled condenser fan (21).

In the third aspect of the present invention, the condition that the amount of circulation of the refrigerant through the refrigerant circuit (10) is being in short supply in the water-cooled operation mode, is determined based on the degree of opening of the electronic expansion valve (14). In other words, it can be estimated that the refrigerant circulation amount is definitely in short supply if the degree of opening of the electronic expansion valve (14) continues to remain below the specified degree of opening. In this case, the controller means (40) controls the air-cooled condenser fan (21) to turn on to thereby lower the high pressure of the refrigerant circuit (10). As a result, it becomes possible to increase the degree of opening of the electronic expansion valve (14) whereby the amount of circulation of the refrigerant through the refrigerant circuit (10) is increased to thereby eliminate the lack of the amount of return oil to the compressor (11).

The present invention provides, as a fourth aspect according to any one of the first to third aspects, a refrigeration system that is characterized in that the compressor is formed by a compressor (11) of the scroll type.

In the fourth aspect of the present invention, the scroll compressor (11) is employed as a compressor which is connected in the refrigerant circuit (10). Generally, compressors of the scroll type such as the scroll compressor (11) have a feature that the amount of refrigerating machine oil present in the discharged refrigerant is great as compared to other types of compressors (for example, reciprocating compressors). That is, in the present invention, the lack of the amount of return oil to the compressor (11) is effectively eliminated in the scroll compressor (11) which is liable to damage, especially when the amount of return oil to the compressor (11) is in short supply.

Advantageous Effects of the Invention

In the present invention, in the water-cooled operation mode that tends to cause the high pressure to increase, the degree of opening of the electronic expansion valve (14) is forcibly decreased if the high pressure becomes higher than the specified pressure, thereby preventing the high pressure of the refrigerant circuit (10) from increasing to an abnormal level. On the other hand, when the degree of opening of the electronic expansion valve (14) is decreased, the refrigerant circulation amount becomes deficient. As a result, there is the possibility that the amount of return oil to the compressor (11) also becomes deficient. However, in the present invention, the air-cooled condenser fan (21) is turned on when the refrigerant circulation amount is determined to be in short supply. Consequently, it is ensured that the high pressure of the refrigerant circuit (10) can be lowered and the degree of opening of the electronic expansion valve (14) can be increased. Accordingly, it is possible to eliminate the lack of the amount of circulation of the refrigerant through the refrigerant circuit (10) to thereby ensure a sufficient amount of return oil to the compressor (11), simultaneously with preventing the high pressure of the refrigerant circuit (10) from increasing to an abnormal level.

Here, in the second aspect of the present invention, the air-cooled condenser fan (21) is turned on if the degree of superheat of the evaporator (15) continues to remain above the specified degree of superheat. This therefore makes it possible to accurately detect the lack of the amount of circulation of the refrigerant through the refrigerant circuit (10) whereby the lack of the amount of return oil to the compressor (11) is eliminated without fail. In addition, in accordance with the present invention, the sensor for detection of the degree of superheat of the evaporator (15) can be used for superheat control of the electronic expansion valve (14) and as a detection means for detection of the lack of the amount of circulation of the refrigerant through the refrigerant circuit (10).

In addition, in the third aspect of the present invention, the air-cooled condenser fan (21) is turned on if the degree of opening of the electronic expansion valve (14) continues to remain below the specified degree of opening. This therefore makes it possible to readily detect the lack of the amount of circulation of the refrigerant through the refrigerant circuit (10) whereby the lack of the amount of return oil to the compressor (11) is easily eliminated.

Furthermore, in accordance with the fourth aspect of the present invention, the lack of the amount of return oil regarding the scroll compressor (11) that especially tends to be in short supply of refrigerating machine oil is eliminated whereby the effects of the first to third aspects of the present invention become more marked.

DESCRIPTION OF THE REFERENCE NUMERALS

Figure 1:
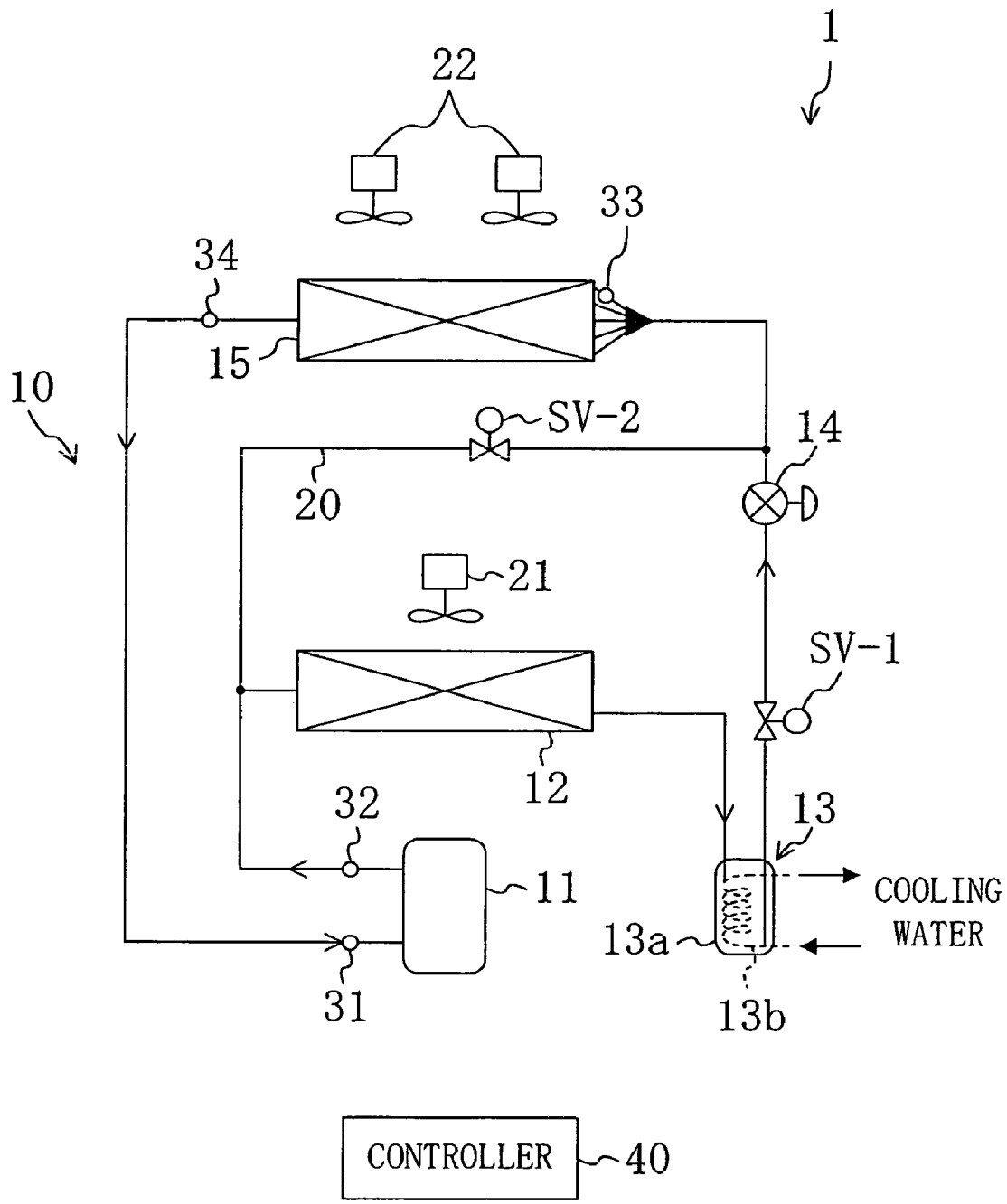
FIG. 1 is a plumbing diagram illustrating a simplified schematic configuration of a refrigeration system according to an embodiment of the present invention.

1: refrigeration system
10: refrigerant circuit
11: scroll compressor (compressor)
12: air-cooled condenser
13: water-cooled condenser
14: electronic expansion valve
15: evaporator
21: air-cooled condenser fan
40: controller (controller means)

BEST MODE FOR CARRYING OUT THE INVENTION

Hereinafter, an embodiment of the present invention will be described in detail with reference to the accompanying drawings.

A refrigeration system (1) of the present embodiment is to provide cooling of the inside of the compartment of a container for use in marine transport or the like. As shown in FIG. 1, the refrigeration system (1) is provided with a refrigerant circuit (10) through which refrigerant is circulated to operate a vapor compression refrigeration cycle.

The refrigeration system (1) includes, as its essential equipment, a compressor (11), an air-cooled condenser (12), a water-cooled condenser (13), an electronic expansion valve (14), and an evaporator (15) which are connected in series.

The compressor (11) is formed by a scroll compressor of the fixed displacement type. The air-cooled condenser (12) is arranged outside the compartment. An air-cooled condenser fan (21) for supplying outside compartment air to the air-cooled condenser (12) is disposed in the vicinity of the air-cooled condenser (12). And in the air-cooled condenser (12), heat exchange takes place between the outside compartment air supplied by the air-cooled condenser fan (21) and the refrigerant. The water-cooled condenser (13) includes a container member (13a) formed in a cylinder shape whose both ends are closed, and a heat transfer pipe (13b) used for cooling and disposed within the container member (13a). Connected to the heat transfer pipe (13b) is a piping line for cooling water. And in the water-cooled condenser (13), heat exchange takes place between the refrigerant which has flowed into the container member (13a) and the cooling water flowing through the heat transfer pipe (13b). Furthermore, the container member (13a) of the water-cooled condenser (13) serves also as a liquid receiver for storage of surplus liquid refrigerant in the refrigerant circuit (10).

The electronic expansion valve (14) is configured such that its degree of opening is adjustable. The degree of opening of the electronic expansion valve (14) is regulated in response to the degree of superheat of the evaporator (15) and the refrigerant pressure on the high pressure side of the refrigerant circuit (10). The details of the operation of controlling the degree of opening of the electronic expansion valve (14) will be described later. The evaporator (15) is arranged within the container compartment and constitutes a cooling heat exchanger for providing cooling of the inside of the compartment. An evaporator fan (22) for supplying inside compartment air to the evaporator (15) is disposed in the vicinity of the evaporator (15). And in the evaporator (15), heat exchange takes place between the inside compartment air supplied by the evaporator fan (22) and the refrigerant.

A first solenoid valve (SV-1) and a second solenoid valve (SV-2) are connected in the refrigerant circuit (10). The first solenoid valve (SV-1) is disposed between the water-cooled condenser (13) and the electronic expansion valve (14). The second solenoid valve (SV-2) is disposed in a bypass pipe (20) one end of which is connected to the discharge side of the compressor (11) and the other end of which is connected to between the electronic expansion valve (14) and the evaporator (15).

Additionally, a plurality of sensors are connected in the refrigerant circuit (10). More specifically, the refrigerant circuit (10) is provided with a low pressure sensor (31), a high pressure sensor (32), an evaporator inlet sensor (33), and an evaporator outlet sensor (34). The low pressure sensor (31) is connected to a suction piping line of the compressor (11) and detects LPT (i.e., the refrigerant pressure on the low pressure side of the refrigerant circuit (10)). The high pressure sensor (32) is connected to a discharge piping line of the compressor (11) and detects HPT (i.e., the refrigerant pressure on the high pressure side of the refrigerant circuit (10)). The evaporator inlet sensor (33) is connected to a distributor on the inflow side of the evaporator (15) and detects EIS (i.e., the temperature of refrigerant flowing into the evaporator (15)). The evaporator outlet sensor (34) is connected to the outflow side of the evaporator (15) and detects EOS (i.e., the temperature of refrigerant flowing out of the evaporator (15)).

The refrigeration system (1) further includes a controller (40) as a controller means. The controller (40) is configured such that based on the detection signals from the sensors (31, 32, 33, 34) and so on, it controls the electronic expansion valve (14), the fans (21, 22), the solenoid valves (SV-1, SV-2) et cetera.

Modes of Operation

The refrigeration system (1) is so configured as to operate selectively either in an air-cooled operation mode or in a water-cooled operation mode depending on the installation situation of the container. Furthermore, the refrigeration system (1) is capable of operating in a defrost operation mode in which defrosting is accomplished by melting the frost on the surface of the heat transfer pipe of the evaporator (15). Hereinafter, each of these operation modes is described in detail.

Air-Cooled Operation Mode

In the air-cooled operation mode, the air-cooled condenser fan (21) and the evaporator fan (22) are turned on while on the other hand the supply of cooling water to the water-cooled condenser (13) is stopped. In other words, in the air-cooled operation mode, a refrigeration cycle, in which only the air-cooled condenser (12) serves as a cold heat source, is operated. In addition, in the air-cooled operation mode, the first solenoid valve (SV-1) is opened while on the other hand the second solenoid valve (SV-2) is closed. Furthermore, the degree of opening of the electronic expansion valve (14) is regulated in response to the difference between the temperature detected by the evaporator outlet sensor (34) and the temperature detected by the evaporator inlet sensor (33), i.e., the degree of superheat (EOS−EIS) of the evaporator (15).

Upon operation of the compressor (11), refrigerant compressed in the compressor (11) flows into the air-cooled condenser (12) in a state with the air-cooled condenser fan (21) turned on. In the air-cooled condenser (12), the refrigerant gives up heat to outside compartment air and is condensed. Thereafter, the refrigerant flows and passes as it is through the water-cooled condenser (13) in a state without the supply of cooling water, is decompressed during passage through the electronic expansion valve (14), and flows into the evaporator (15). In the evaporator (15), the refrigerant absorbs heat from inside compartment air and is evaporated. As a result, the inside of the container compartment is cooled. The refrigerant evaporated in the evaporator (15) is drawn into and again compressed in the compressor (11).

Water-Cooled Operation Mode

In the water-cooled operation mode, at the same time that the evaporator fan (22) is turned on the air-cooled condenser fan (21) is stopped, and the supply of cooling water is provided to the water-cooled condenser (13). In other words, in the water-cooled operation mode, a refrigeration cycle, in which only the water-cooled condenser (13) serves as a cold heat source, is operated. In addition, in the water-cooled operation mode, the first solenoid valve (SV-1) is opened while on the other hand the second solenoid valve (SV-2) is closed. Furthermore, the degree of opening of the electronic expansion valve (14) is regulated in principle in response to the difference between the detected temperature by the evaporator outlet sensor (34) and the detected temperature by the evaporator inlet sensor (33), i.e., the degree of superheat (EOS−EIS) of the evaporator (15).

Upon operation of the compressor (11), refrigerant compressed in the compressor (11) flows into the air-cooled condenser (12) in a state with the air-cooled condenser fan (21) tuned off. The refrigerant flows and passes as it is through the air-cooled condenser (12) and flows into the water-cooled condenser (13) in a state with the supply of cooling water provided. In the water-cooled condenser (13), the refrigerant gives up heat to the cooling water and is condensed. Thereafter, the refrigerant is decompressed during passage through the electronic expansion valve (14), and flows into the evaporator (15). In the evaporator (15), the refrigerant absorbs heat from inside compartment air and is evaporated. As a result, the inside of the container compartment is cooled. The refrigerant evaporated in the evaporator (15) is drawn into and again compressed in the compressor (11).

Due to the difference in the rate of heat exchange between the air-cooled condenser (12) and the water-cooled condenser (13) (or other parameter) in the water- and air-cooled operation modes, the refrigerant circulation amount required in the air-cooled operation mode is greater than that required in the water-cooled operation mode. Consequently, the amount of refrigerant required in the air-cooled operation mode is filled, as a specified amount of refrigerant, into the refrigerant circuit (10) of the refrigeration system (1) of the present embodiment. However, if the water-cooled operation mode is operated at that refrigerant filling amount, the refrigerant filling amount becomes excessive relative to the required refrigerant circulation amount. As a result, surplus refrigerant "falls asleep" (as termed in the industry) or accumulates in the water-cooled condenser, leading to the possibility that the high pressure of the refrigerant circuit may increase to an abnormal level.

In cope with the above, in the refrigeration system (1) of the present embodiment, the degree of opening of the electronic expansion valve (EV) (14) is so controlled as to inhibit the high pressure from increasing to an abnormal level. Hereinafter, how the degree of opening of the electronic expansion valve (14) is controlled is described with reference to a flow chart shown in FIG. 2.

The degree of opening of the electronic expansion valve (14) is controlled as follows. That is, in Steps S1-S4, the degree of opening of the electronic expansion valve (14) is controlled such that the refrigerant pressure (high pressure HPT) detected by the high pressure sensor (32) will not increase above a specified pressure. More specifically, in Step S1, the high pressure HPT is compared with a first specified pressure of, for example, 2300 kPa. If Step S1 finds that the high pressure HPT is higher than the first specified pressure, then the control procedure moves to Step S2, and the degree of opening of the electronic expansion valve (14) is decreased 10 percent (i.e., decreased by an amount of 10 percent relative to the degree of opening of the electronic expansion valve (14) when it is fully opened). On the other hand, if Step 51 finds that the high pressure HPT is equal to or less than the first specified pressure, then the control procedure moves to Step S3. In Step S3, the high pressure HTP is compared with a second specified pressure of, for example, 2100 kPa. If Step S3 finds that the high pressure HPT is higher than the second specified pressure, then the control procedure moves to Step S4, and the degree of opening of the electronic expansion valve (14) is decreased 5 percent. On the other hand, if Step S3 finds that the high pressure HPT is equal to or less than the second specified pressure, then the control procedure moves to Step S5. In the way as described above, in Steps S1-S4, the degree of opening of the electronic expansion valve (14) is subject to forcible decrease if the high pressure HPT is more than a specified pressure. This prevents the high pressure from increasing abnormally during the aforesaid water-cooled operation mode.

In addition, in Steps S5-S8, the degree of opening of the electronic expansion valve (14) is regulated such that the degree of superheat (EOS-EIS) of the evaporator (15) falls within the range between 1° C. and 6° C. Stated another way, if Step S5 finds that the degree of superheat (EOS-EIS) is less than 1° C., the degree of opening of the electronic expansion valve (14) is decreased 1.5 percent in Step S6. On the other hand, if the degree of superheat (EOS-EIS) is greater than 6° C. in Step S6, the degree of opening of the electronic expansion valve (14) is increased 1.5 percent in Step S7. In the way as described above, in Steps S5-S7, if the degree of superheat (EOS-EIS) deviates from a predetermined range, the degree of opening of the electronic expansion valve (14) is regulated to an adequate value to thereby keep the degree of superheat (EOS-EIS) constant.

However, if the degree of opening of the electronic expansion valve (14) is regulated in response to the degree of superheat while on the other hand the degree of opening of the electronic expansion valve (14) is controlled to be decreased forcibly if the high pressure HPT exceeds a specified pressure, the degree of opening of the electronic expansion valve (14) may continue to remain decreased in order to inhibit the high pressure from increasing abnormally during the water-cooled operation mode. In this case, the possibility arises that the amount of circulation of the refrigerant through the refrigerant circuit (10) may become deficient, and the amount of return oil to the compressor (11) may also become deficient. To cope with this, in the refrigeration system (1) of the present embodiment, the air-cooled condenser fan (21) is turned on if it is determined during the water-cooled operation mode that the amount of circulation of the refrigerant through the refrigerant circuit (10) is in short supply.

More specifically, if, when the air-cooled condenser fan (21) is turned off during the water-cooled operation mode, either the degree of opening of the electronic expansion valve (14) continues to remain equal to or less than a specified degree of opening (for example, 15 percent) for a predetermined period of time (for example, 10 minutes) or longer, or the degree of superheat (EOS-EIS) of the evaporator (15) continues to remain more than a predetermined temperature (for example, 25° C.) for a predetermined period of time (for example, 10 minutes) or longer, it is determined that the amount of circulation of the refrigerant through the refrigerant circuit (10) is in short supply, and the controller (40) controls the air-cooled condenser fan (21) to turn on. As a result, in the air-cooled condenser (12), refrigerant gives up heat to air supplied by the air-cooled condenser fan (21) and is condensed whereby the high pressure HTP in the refrigerant circuit (10) drops. As a result, the degree of opening of the electronic expansion valve (14) gradually increases in response to the degree of superheat (EOS-EIS), and the lack of the refrigerant circulation amount is eliminated.

On the other hand, if, when the air-cooled condenser fan (21) is operated as described above, either the degree of opening of the electronic expansion valve (14) continues to remain equal to or more than a predetermined degree of opening (for example, 40 percent) for a predetermined period of time (for example, 5 minutes) or longer, or the degree of superheat (EOS-EIS) of the evaporator (15) continues to remain less than a predetermined temperature (for example, 6° C.) for a predetermined period of time (for example, 5 minutes) or longer, it is determined that the lack of the refrigerant circulation amount is now eliminated, and the controller (40) controls the air-cooled condenser fan (21) to turn off.

Figure 2:
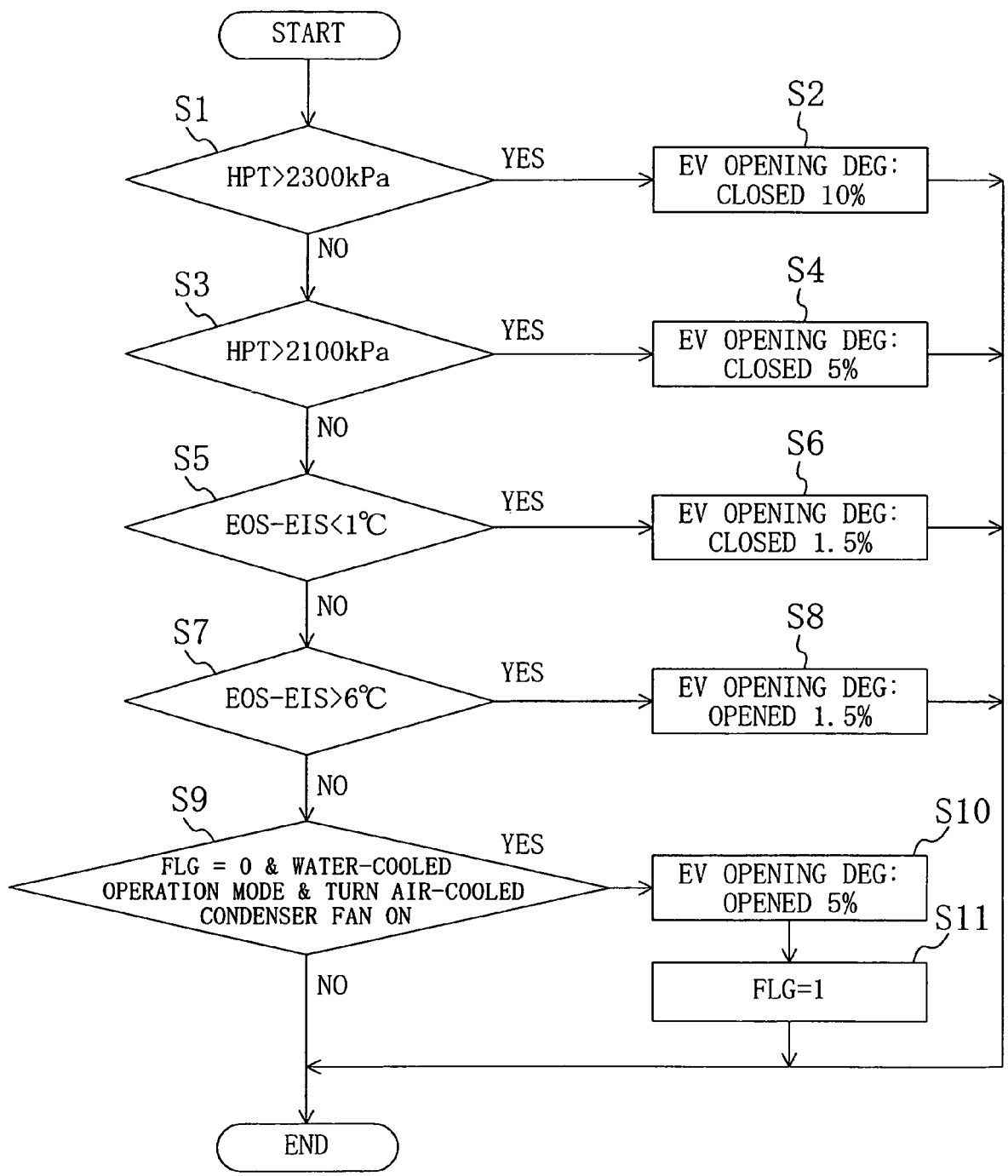
FIG. 2 is a flow chart illustrating control operation for an electronic expansion valve.
Figure 3:
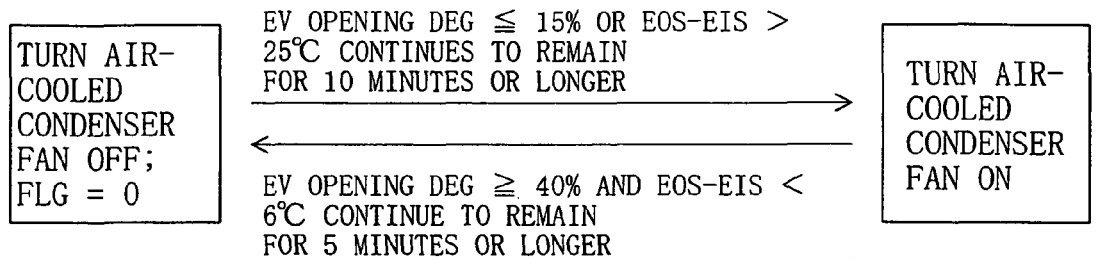
FIG. 3 is a state transition diagram of an air-cooled condenser fan during a water-cooled operation mode.

In addition, referring to Steps S9 to S11 of FIG. 2, if the air-cooled condenser fan (21) is turned on in order to eliminate the lack of the refrigerant circulation amount during the water-cooled operation mode when FLG (flag)="0", the degree of opening of the electronic expansion valve (14) is increased 5 percent to provide control that FLG (flag) becomes "1". In other words, this flag is a decision flag used to determine whether or not the degree of opening of the electronic expansion valve (14) has been increased 5 percent, and these Steps S9-S11 mean that the degree of opening of the electronic expansion valve (14) is increased 5 percent just one time, when turning on the air-cooled condenser fan (21) placed in the stopped state during the water-cooled operation mode. By providing control (Steps S9-S11), the degree of opening of the electronic expansion valve (14) in the decreased state is positively increased, thereby making it possible to quickly eliminate the lack of the refrigerant circulation amount.

Defrost Operation Mode

Next, the above-mentioned defrost operation mode is described. In the refrigeration system (1), after performing a pump down operation to cause refrigerant accumulated in the evaporator (15) to be temporarily drawn into the compressor (11) and stored on the side of the water-cooled condenser (13), the defrost operation mode is operated. In the defrost operation mode, so-called hot gas defrosting, in which refrigerant discharged from the compressor (11) is bypassed to the evaporator (15) to effect defrosting, is performed.

Figure 4:
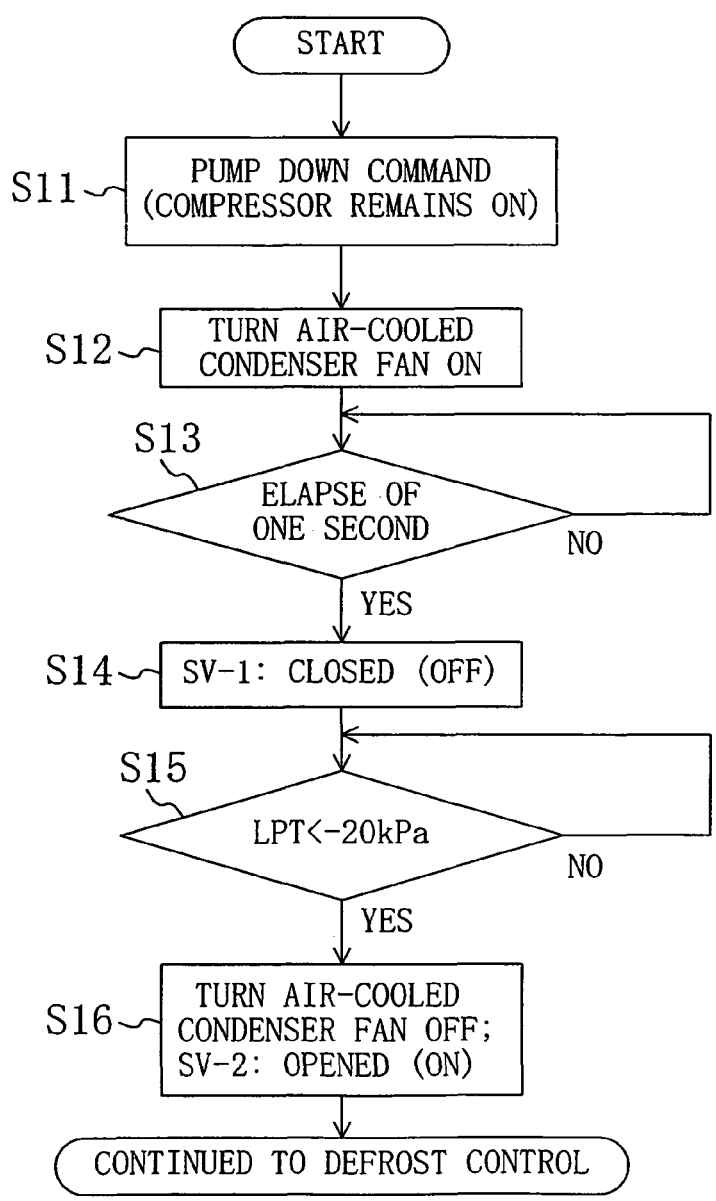
FIG. 4 is a flow chart illustrating control operation at the time when a defrost operation mode is started.

As shown in FIG. 4, at the time of transition from the water-cooled operation mode to the defrost operation mode, a command to perform a pump down operation is issued to the controller (40) in Step S11. As a result, the air-cooled condenser fan (21) is turned on (Step S12). One second later (after Step S13), the first solenoid valve (SV-1) is closed (Step S14). As a result, refrigerant accumulated in the evaporator (15) is dawn into the compressor (11) and then delivered to the water-cooled condenser (13). In the water-cooled condenser (13), refrigerant cooled by cooling water is condensed and accumulated within the container member (13a). This pump down operation continues until the time that LPT (the refrigerant pressure on the low pressure side detected by the low pressure sensor (31)) reaches less than a specified pressure (for example, minus 20 kPa) (Step S15). Upon completion of the pump down operation, the air-cooled condenser fan (21) is turned off, and the second solenoid valve (SV-2) is opened. As a result, refrigerant discharged from the compressor (11) is fed via the bypass pipe (20) to the evaporator (15). In the evaporator (15), high-temperature refrigerant flows and passes through the heat transfer pipe whereby the frost on the heat transfer pipe is melted to perform defrosting of the evaporator (15).

During the defrost operation mode, it is arranged such that, immediately before the time that the pump down operation is started by closing the first solenoid valve (SV-1) (Step S14), the air-cooled condenser fan (21) is turned on (Step S12). If the air-cooled condenser fan (21) is not turned on in advance of the pump down operation, there is a possibility that refrigerant condenses to a liquid refrigerant and is accumulated in the water-cooled condenser (13) at the start of the pump down operation to cause the high pressure to abnormally increase. However, if the air-cooled condenser fan (21) is turned on in advance as described above, refrigerant already condenses in the air-cooled condenser (12) before the start of the pump down operation, thereby making it possible to reduce the high pressure. Accordingly, it becomes possible to inhibit without fail the high pressure from abnormally increasing during the pump down operation, and the reliability of the refrigeration system (1) during the defrost operation mode is enhanced.

Figure 5:
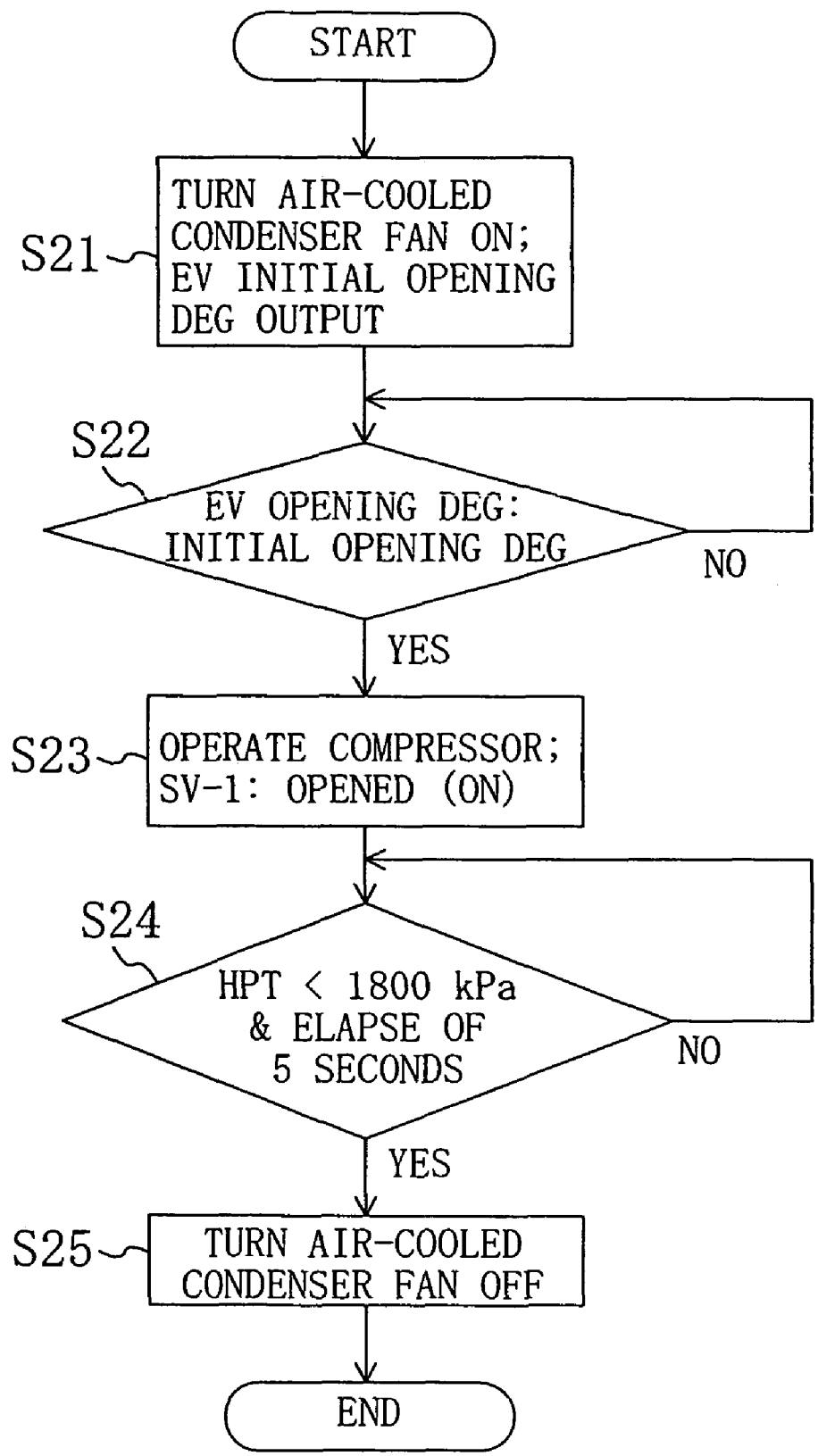
FIG. 5 is a flow chart illustrating control operation at the time of transition from a defrost operation mode to a water-cooled operation mode.
Figure 6:
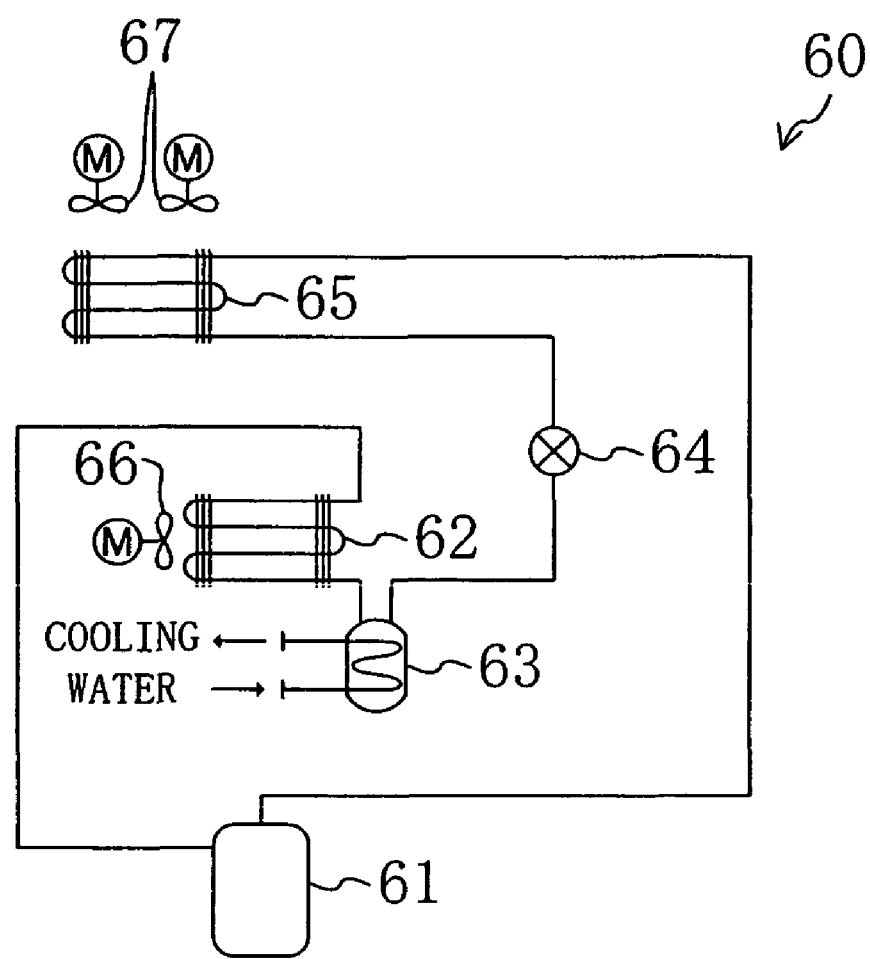
FIG. 6 is a plumbing diagram illustrating a simplified schematic configuration of a conventional refrigeration system.

On the other hand, upon completion of the defrost operation mode, the second solenoid valve (SV-2) is closed and, in addition, the compressor (11) is placed out of operation. Thereafter, when the water-cooled operation mode is again performed, the air-cooled condenser fan (21) is temporarily turned on in Step S21 of FIG. 5, and the degree of opening of the electronic expansion valve (EV) (14) is maintained at its initial degree of opening (Step S22). Furthermore, the compression (11) is placed in operation and, in addition, the first solenoid valve (SV-1) is opened (Step S23). Thereafter, upon elapse of a predetermined period of time (for example, 5 seconds) and when the high pressure HPT becomes less than a specified pressure of, for example, 1800 kPa, the air-cooled condenser fan (21) is turned off, and the aforesaid water-cooled operation mode is resumed.

As described above, at the time of transition from the defrost operation mode to the water-cooled operation mode, it is arranged such that the air-cooled condenser fan (21) is temporarily turned on. As a result, it becomes possible to inhibit without fail the high pressure from abnormally increasing at the start up of the water-cooled operation mode.

Advantageous Effect of the Embodiment

In accordance with the above-described embodiment, the degree of opening of the electronic expansion valve (14) is forcibly decreased if during the water-cooled operation mode the high pressure becomes higher than the specified pressure whereby the high pressure is inhibited from increasing to an abnormal level. Therefore, it becomes possible to improve the reliability of the refrigeration system (1). On the other hand, if the refrigerant circulation amount becomes deficient when the degree of opening of the electronic expansion valve (14) is decreased during the water-cooled operation mode, the controller (40) detects such deficiency based on the degree of superheat (EOS–EIS) or the degree of opening of the electronic expansion valve (14), and controls the air-cooled condenser fan (21) to turn on. As a result, it becomes possible to lower the high pressure whereby the degree of opening of the electronic expansion valve (14) can be gradually increased in response to the degree of superheat (EOS–EIS). Consequently, since it is possible to eliminate the lack of the refrigerant circulation amount, this ensures a sufficient amount of return oil to the compressor (11). Therefore, it becomes possible to prevent the compressor (11) from being damaged, and the reliability of the refrigeration system (1) is further enhanced.

It should be noted that the above-described embodiment is essentially a preferable exemplification which is not intended in any sense to limit the scope of the present invention, its application, or its application range.

INDUSTRIAL APPLICABILITY

As has been described above, the present invention is useful as a technique for the return back of oil to a compressor incorporated in a refrigeration system in which either one of a water-cooled condenser and an air-cooled condenser is used as a cold heat source to condense refrigerant.

What is claimed is:

1. A refrigeration system comprising: (a) a refrigerant circuit in which a compressor, an air-cooled condenser, a water-cooled condenser, an electronic expansion valve, and an evaporator are connected and through which a refrigerant is circulated to operate a refrigeration cycle and (b) an air-cooled condenser fan for supplying air to the air-cooled condenser, the refrigeration system being so configured as to operate selectively either (i) in an air-cooled operation mode in which the refrigerant is passed through the air-cooled condenser in a state with the air-cooled condenser fan turned on and through the water-cooled condenser in a state with a supply of cooling water stopped, or (ii) in a water-cooled operation mode in which the refrigerant is passed through the air-cooled condenser in a state with the air-cooled condenser fan turned off and through the water-cooled condenser in a state with the supply of cooling water provided, the degree of opening of the electronic expansion valve either being regulated in response to the degree of superheat of the refrigerant leaving the evaporator or being forcibly decreased if the high pressure of the refrigerant circuit becomes higher than a specified pressure, wherein the refrigeration system includes controller means which turns on the air-cooled condenser fan if it is determined during the water-cooled operation mode that the amount of circulation of the refrigerant through the refrigerant circuit is in short supply.

2. The refrigeration system of claim 1, wherein the controller means determines that the refrigerant circulation amount is in short supply if the degree of superheat of the refrigerant leaving the evaporator continues to remain above a specified degree of superheat for a predetermined period of time, and then turns on the air-cooled condenser fan.

3. The refrigeration system of claim 1, wherein the controller means determines that the refrigerant circulation amount is in short supply if the degree of opening of the electronic expansion valve continues to remain below a specified degree of opening for a predetermined period of time, and then turns on the air-cooled condenser fan.

4. The refrigeration system of claim 1, wherein the compressor is formed by a compressor of the scroll type.

* * * * *